US009620026B2

United States Patent
Strode et al.

(10) Patent No.: US 9,620,026 B2
(45) Date of Patent: Apr. 11, 2017

(54) CONTEXTUAL GRAPHICAL USER INTERFACE TRAINING

(71) Applicant: Red Hat, Inc., Raleigh, NC (US)

(72) Inventors: Maureen Emily Strode, Cambridge, MA (US); Ryan John Lerch, Cambridge, MA (US); Tom Callaway, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 289 days.

(21) Appl. No.: 14/193,869

(22) Filed: Feb. 28, 2014

(65) Prior Publication Data
US 2015/0248839 A1 Sep. 3, 2015

(51) Int. Cl.
*G09B 19/00* (2006.01)
*G09B 5/02* (2006.01)
*G06F 9/44* (2006.01)
*G06F 3/0484* (2013.01)
*G06F 3/0482* (2013.01)

(52) U.S. Cl.
CPC ............ *G09B 5/02* (2013.01); *G06F 3/0482* (2013.01); *G06F 3/04842* (2013.01); *G06F 9/4446* (2013.01); *G09B 19/00* (2013.01); *G09B 19/0053* (2013.01)

(58) Field of Classification Search
CPC .......................... G09B 19/0053; G06F 9/4446
See application file for complete search history.

(56) References Cited

U.S. PATENT DOCUMENTS

| 5,175,812 A | * | 12/1992 | Krieger | ............... G06F 3/04895 715/708 |
| 5,317,688 A | * | 5/1994 | Watson | .............. G09B 19/0053 715/707 |
| 5,535,422 A | * | 7/1996 | Chiang | ................. G06F 9/4446 434/118 |

(Continued)

FOREIGN PATENT DOCUMENTS

| WO | WO97/44766 | 11/1997 |
| WO | WO2008/117285 | 10/2008 |

OTHER PUBLICATIONS

Kickstarter, "InteractBuilder 3.0: Apps Without Programming" https://www.kickstarter.com/projects/532972293/interactbuilder-30-interactive-apps-without-progra, Jan. 7, 2013 (16 pages).

(Continued)

*Primary Examiner* — Peter Egloff
(74) *Attorney, Agent, or Firm* — Haynes and Boone, LLP

(57) ABSTRACT

A method for contextual graphical user interface (GUI) training includes, with a training module, switching from a normal mode of the GUI to a lesson mode to provide a lesson to a user, the lesson being one of a number of lessons that were preselected by the user. The method further includes, while in the lesson mode, overlaying instructions of a task onto the GUI, with the training module, providing example user input to demonstrate the task, with the training module, undoing the task, prompting the user to perform the task, notifying the user that an input received by the computing system does not correspond to the demonstrated task, and recording completion of the task in response to input from the user, the input corresponding to successful completion of the demonstrated task.

20 Claims, 5 Drawing Sheets

(56) References Cited

U.S. PATENT DOCUMENTS

| | | | |
|---|---|---|---|
| 6,219,047 B1* | 4/2001 | Bell | G06F 9/4446 715/705 |
| 6,340,977 B1* | 1/2002 | Lui | G06F 9/4446 715/706 |
| 7,000,187 B2* | 2/2006 | Messinger | G06F 9/4446 715/705 |
| 7,632,101 B2* | 12/2009 | Braunberger | G09B 7/00 434/322 |
| 8,554,705 B1 | 10/2013 | Sitnikau | |
| 2002/0146674 A1* | 10/2002 | Betz | G09B 7/02 434/350 |
| 2003/0222898 A1* | 12/2003 | Macomber | G06F 9/4446 715/709 |
| 2003/0223411 A1 | 12/2003 | de la Fuente | |
| 2005/0138559 A1* | 6/2005 | Santos-Gomez | G06F 9/4446 715/709 |
| 2006/0014128 A1* | 1/2006 | Mizuno | G09B 15/00 434/307 R |
| 2006/0105302 A1* | 5/2006 | Breiburg | G09B 5/00 434/118 |
| 2006/0224961 A1* | 10/2006 | Omi | G06F 3/04895 715/700 |
| 2007/0015118 A1 | 1/2007 | Nickell et al. | |
| 2008/0189612 A1* | 8/2008 | Zhang | G06F 9/4446 715/709 |
| 2008/0269919 A1* | 10/2008 | Nissen | G06F 3/0481 700/32 |
| 2012/0110444 A1* | 5/2012 | Li | G06F 17/2276 715/256 |
| 2012/0258437 A1 | 10/2012 | Sadeh-Koniecpol et al. | |
| 2013/0288221 A1* | 10/2013 | Kearns | G09B 7/00 434/362 |
| 2014/0282105 A1* | 9/2014 | Nordstrom | H04L 65/403 715/753 |

OTHER PUBLICATIONS

Nuance®, "Dragon Naturally Speaking-Installation and User Guide" http://www.nuance.com/ucmprod/groups/dragon/@web-enus/documents/collateral/nc_025216.pdf, Jul. 11, 2012, (290 pages).

* cited by examiner

CONTEXTUAL GRAPHICAL USER INTERFACE TRAINING

BACKGROUND

The present disclosure relates generally to graphical user interfaces, and more particularly to contextual training for such graphical user interfaces.

A graphical user interface displays information to a user and provides the user with a mechanism to manipulate that display. For example, typical computing systems often include a monitor or touchscreen that displays information in the form of graphics and texts. Various applications also include tools such as buttons for the user to touch or click. These buttons cause the display to change and display different information or cause the computing system associated with the graphical user interface to perform various functions.

One type of graphical user interface is a graphical desktop environment. Desktop environments are a common component of an operating system. A desktop provides a space for a user to place various applications or files associated with those applications. For example, the desktop environment may provide various mechanisms that allow a user to browse and open applications or files. The desktop environment may also provide tools to change the settings of the system associated with the graphical user interface.

Software designers often develop new concepts to improve graphical user interfaces such as a desktop environment. In some cases, a new desktop environment may include several features that may increase the productivity of a user. But, the new desktop environment may be substantially different than any previous desktop environments with which a user may have worked. This can be frustrating and overwhelming for a user to learn the new desktop environment.

Accordingly, it would be desirable to provide improved systems and methods for graphical user interface training.

SUMMARY

According to certain illustrative examples, a method for contextual graphical user interface (GUI) training includes, with a training module, switching from a normal mode of the GUI to a lesson mode to provide a lesson to a user, the lesson being one of a number of lessons that were preselected by the user. The method further includes, while in the lesson mode, overlaying instructions of a task onto the GUI, with the training module, providing example user input to demonstrate the task, with the training module, undoing the task, prompting the user to perform the task, notifying the user that an input received by the computing system does not correspond to the demonstrated task, and recording completion of the task in response to input from the user, the input corresponding to successful completion of the demonstrated task.

According to certain illustrative examples, a computing system includes a processor and a memory comprising machine readable instructions that when executed by the processor, cause the processor to prompt a user to select a number of lessons for a graphical user interface (GUI), each lesson comprising a number of tasks associated with the GUI, schedule selected lessons for the user, at a scheduled lesson start time, switch from a normal mode of the GUI to a lesson mode to provide the scheduled lesson to the user. The machine readable instructions further cause the processor to, while in the lesson mode, overlay instructions of a task of the scheduled lesson onto the GUI, the instructions comprising a demonstration of the task of the scheduled lesson. The machine readable instructions further cause the processor to, while in lesson mode, maintain GUI functionality related to tasks not associated with the lesson, notify the user that an input received by the system does not correspond to the demonstrated task of the scheduled lesson, and record completion of the task of the scheduled lesson in response to input from the user, the input corresponding to successful completion of the demonstrated task of the scheduled lesson.

According to certain illustrative examples, a non-transitory, machine-readable medium comprising a set of machine readable instructions that when executed by a processor, cause the processor to switch from a normal mode of the GUI to a lesson mode to provide a lesson to a user, the lesson teaching the user how to perform a task within the GUI, the lesson being one of a number of lessons that were preselected by the user, while in the lesson mode, overlay instructions of the task onto the GUI, the instructions related to the task, while in lesson mode, assume user input control to demonstrate the task, maintain GUI functionality related to tasks not associated with the lesson, notifying the user that an input received by the system does not correspond to the demonstrated task, recording completion of the task in response to input from the user, the input corresponding to successful completion of the demonstrated task, lock normal user while the task is demonstrated, unlock user input after the task is demonstrated.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to have improved methods to help users learn the features of a new graphical user interface. According to certain illustrative examples, a graphical user interface includes a training module. The training module provides lessons to a user related to the graphical user interface while the user is working within that graphical user interface. Thus, the user receives training in the context of actually using the graphical user interface. Specifically, the training module can cause graphical user interface to switch from a normal mode to a lesson mode. While in lesson mode, the system provides a lesson that includes instructions to a user regarding use of the graphical user interface mode. The lesson may be one of several lessons preselected by the user.

The lesson may include one or more tasks for the user to learn. For each task, there may be a set of instructions provided to the user. The instructions may include overlays that point to certain icons or widgets on the graphical user interface. In some examples, the system may take control and demonstrate how to perform a particular task. The user may then be provided control and asked to perform the recently demonstrated task. The user may be notified whether the task was done correctly. If the task was not done correctly, the user may be asked to try again. If the task was done correctly, then the system may record the user's progress.

Unlike traditional training methods, the functionality of the applications associated with the graphical user interface is not disturbed. Specifically, the user is not put into a "sandbox" environment where only a few features are available. Rather, the user can still perform other tasks not related to the immediate lesson. The user can also exit out of the lesson mode and switch back to normal mode at any time desired. Thus, through methods and systems embodying principles described herein, a user is provided with a more efficient and intuitive, contextual graphical user interface training.

Figure 1:
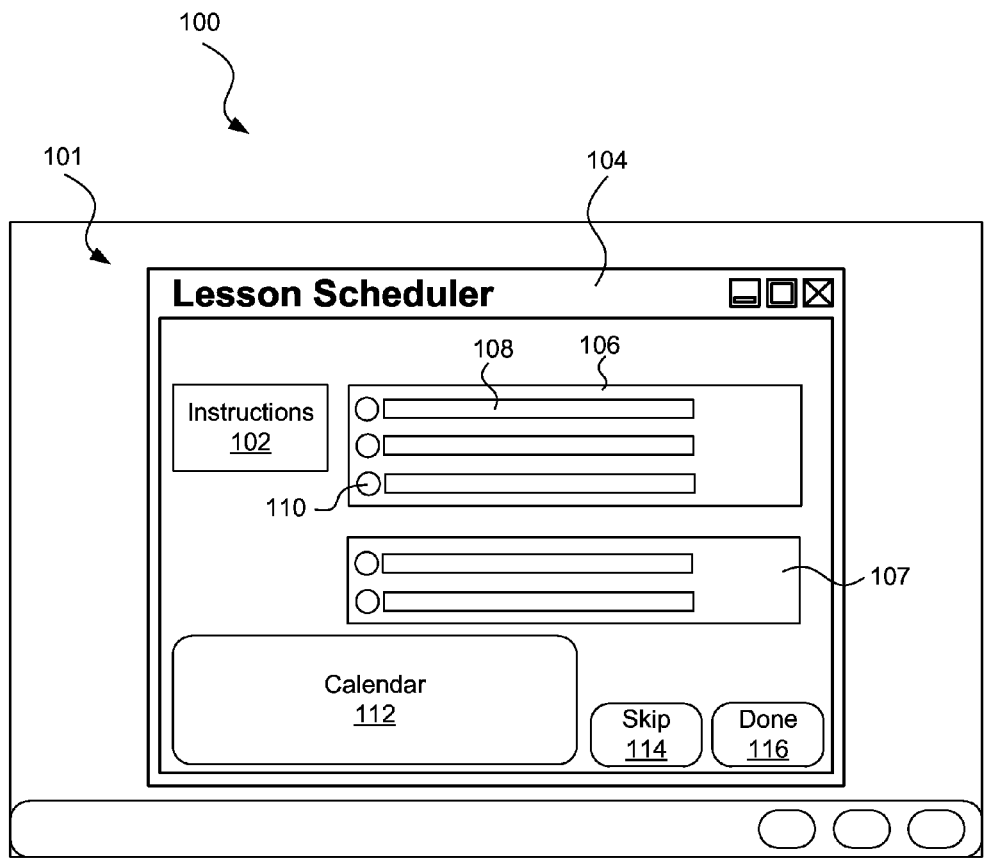
FIG. 1 is a diagram showing an illustrative prompt for a user to set up graphical user interface training, according to one example of principles described herein.

FIG. 1 is a diagram showing an illustrative prompt 104 for a user to set up graphical user interface training. According to certain illustrative examples, when a user first opens a graphical user interface, the user may be prompted to set up and schedule a number of lessons for that graphical user interface. For example, when a user first logs on to a computing system with a graphical desktop environment, the user may be prompted to set up lessons for that graphical desktop environment. Thus, the user can decide whether he or she would like to use the training module and if so, what lessons the user thinks would be most helpful.

According to the present example, the graphical user interface 100 is a graphical desktop environment 101. When the graphical desktop environment 101 first opens up, a lesson schedule prompt 104 appears. The lesson prompt 104 displays a number of lessons 106, 107, which include select buttons 110, and task descriptions 108. The prompt 104 also includes instructions 102, a calendar tool 112, a skip button 114, and a done button 116.

The prompt 104 may be presented to a user as a window in the desktop environment 101. This window may appear when the user first uses the new graphical desktop environment 101. The user can decide at that point whether to schedule any lessons.

The prompt 104 may include a set of lessons 106, 107. The lessons 106, 107 may present a title of the lesson that indicates what materials the lesson contains. For example, a lesson may be titled "Opening Applications". The content of that lesson may teach a user how to open applications in the new desktop environment.

A lesson 106 may include a number of tasks 108. For example, the opening applications lesson may include various tasks for opening applications in various ways. These tasks 108 may be presented to a user as text that describes what the task involves. Thus, a user can quickly browse through the tasks 108 within a particular lesson 106 to determine whether that lesson should be taken. If the user feels familiar with that particular subject matter, the user can choose not to take that lesson. But, if the user would like to learn more about the tasks 108 within a particular lesson, the user can select those tasks 108.

In some examples, next to each task description 108, a select button 110 may be provided to the user. The select buttons 110 allow the user to select the tasks within a lesson that he or she wishes to learn through the training module. The select buttons 110 may be in the form of checkboxes. Thus, the task descriptions which the user has selected may display a check mark.

The prompt 104 may also include a set of instructions 102 to inform the user about the training module and request that the user set up a lesson schedule by selecting the desired lessons. The instructions 102 may also give the user other information. For example, the instructions 102 might inform the user that if he or she does not sign up for lessons at the present time, the user may still go back in at a later time and register for those lessons.

The calendar tool 112 provides the user with a mechanism to schedule lessons. For example, the user may select one of the lessons 106, 107. Upon selecting a lesson 106, 107, the user may be directed to the calendar tool 112 to pick an upcoming date on which to schedule the lesson. In some examples, the calendar tool 112 may be associated with a calendar system used by the user. Thus, the user can compare prospective times with the user's current schedule.

After a user has selected all of the lessons that he or she desires to take, the user can click the done button 116. The done button 116 saves the users selection and schedules the lessons that have been selected by the user. The prompt 104 may include a skip button 114. Some users may prefer not to use the training module and would prefer to figure out how to use the new graphical user interface 100 on their own. Such users may simply skip the training process using the skip button 114.

If a user chooses to skip the lessons, the training module can be designed to not bother the user for any additional lessons. In some examples, however, the user may receive one final prompt 104 before the user is never reminded again. This final prompt 104 may be presented to the user a predetermined amount of time after the user first logs on. For example, the user may receive a final prompt 48 hours after first login. This gives the user some time to determine whether he or she could benefit from the lessons.

In some examples, the predetermined amount of time may be based on how long the user has spent with the new graphical user interface. For examples, the operating system may keep track of how long the user uses the graphical user interface. The training module can then send the final prompt sometime after 20 hours of time has passed. The training module can be designed to provide the prompt 104 at a convenient time. For example, the prompt 104 will not interrupt the user while the user is working. Rather, the prompt 104 can appear when the user first logs in after the predetermined amount of time has passed. Alternatively, the prompt 104 can appear when the user disengages a screen-lock sometime after the predetermined amount of time has passed.

Figure 2A:
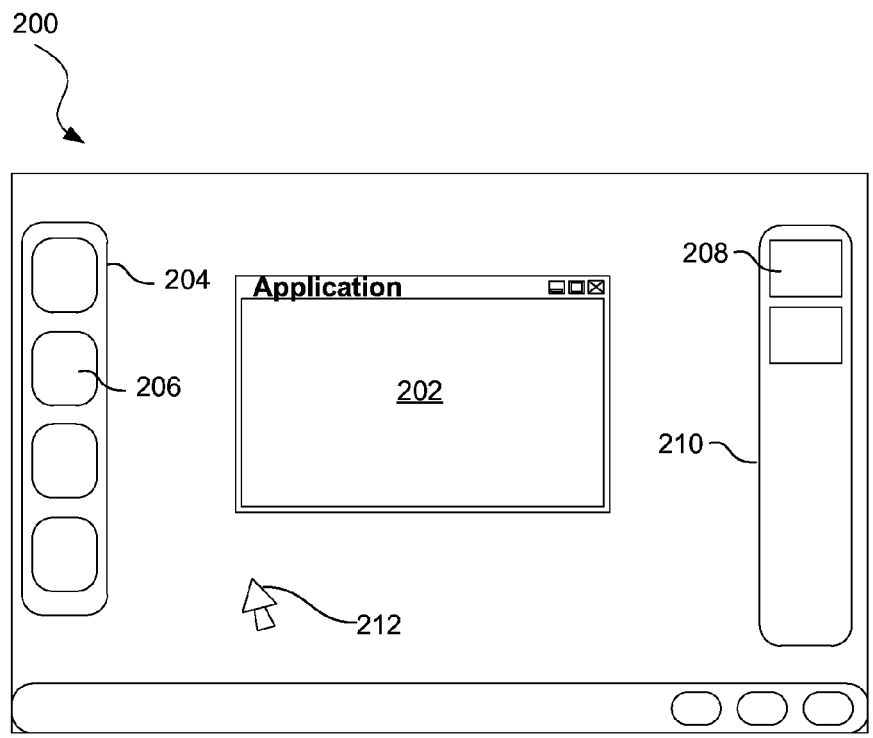
FIGS. 2A and 2B are diagrams showing illustrative overlays to help a user learn a new graphical user interface, according to one example of principles described herein.
Figure 2B:
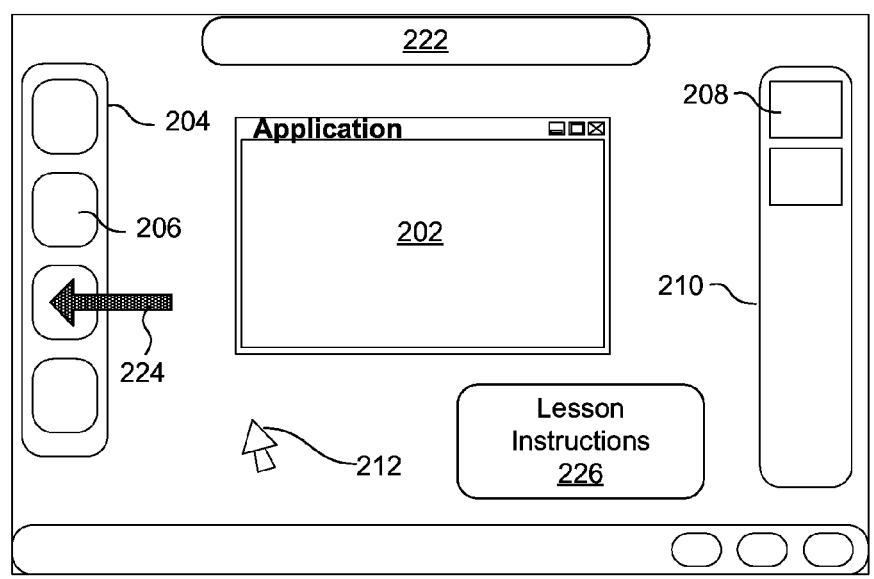

FIGS. 2A and 2B are diagrams showing illustrative overlays to help a user learn a new graphical user interface. FIG. 2A is a diagram showing an illustrative graphical user interface while in normal mode. In the present example, the graphical user interface is a graphical desktop environment 200. The graphical desktop environment 200 includes an application widget 204 that includes a number of applications 206. The graphical desktop environment 200 may also include a workspace widget 210 that allows the user to switch between multiple workspaces represented by workspace objects 208. The graphical desktop environment 200 also includes open applications 202 and a cursor 212.

While in normal mode, the graphical desktop environment 200 operates as usual. The user has access to all available features. Additionally, there are no overlays or anything indicating a lesson. But, when a lesson starts, the training module switches the graphical desktop environment 200 to a lesson mode.

FIG. 2B is a diagram showing an illustrative graphical desktop environment 220 while in lesson mode. While in lesson mode, the training module uses various tools to teach a user how to use various functions of the graphical desktop environment 220. In some examples, while in lesson mode, the graphical user interface 220 may provide an indicator 222 that notifies a user that the graphical user interface 220 is in lesson mode. The indicator 222 may be in the form of a banner at the top of the screen. The banner may recite "Lesson Mode" or similar text that indicates the status of the graphical user interface to the user. In some examples, various icons may be displayed to a user.

While in lesson mode, various overlays 224, 226 may be used to aid the lesson process. Such overlays may be presented as graphical objects that are placed over other graphics within the graphical desktop environment 220. For example, the overlays may include arrows 224 or multimedia instructions 226.

Arrows 224 may be used to point to certain features of the graphical user interface 220. For example, the arrow 224 may point to an application icon. This indicates to the user that the application icon 206 is of interest for the present task being taught to the user.

Along with the arrow 224, instructions 226 may be overlaid as well. In some examples, the instructions 226 may include text to explain things to the user. For example, the text may read "move the cursor to the highlighted application icon." The user thus knows that he or she is to move the cursor 212 to the application icon indicated by the arrow 224.

In some examples, the instruction overlay 226 may include graphics. For example, the instruction overlay 226 may illustrate a combination of keyboard keys which the user can press to perform a particular action. In some examples, the instructions 226 may include video. For example, the instructions 226 may present a screencast of the action being performed. In such cases, the instruction overlay 226 may be bigger than as illustrated.

According to certain illustrative examples, while in lesson mode, all the normal features of the graphical user interface are still available. This means that the graphical user interface is not running a simple mode or a reduced mode to produce a "sandbox" environment. Rather, the full graphical user interface is available to the user.

While in lesson mode, the user may be provided with a demonstration on how to perform a task. Subsequently, the user may be asked to repeat that task. While the user may have the ability to perform other tasks besides the recently demonstrated tasks, the training module may notify the user if the demonstrated task was not repeated correctly. If, however, the user does repeat the task correctly, the lesson may proceed to demonstrate a different task.

In some examples, the user may exit lesson mode and return to normal mode at any time by performing a particular action. For example, the user may press the escape key on the keyboard. In some case, an exit graphical object (not shown) may be overlaid on the graphical user interface 220. The user can then click on that exit graphical object to exit the lesson mode.

Figure 3:
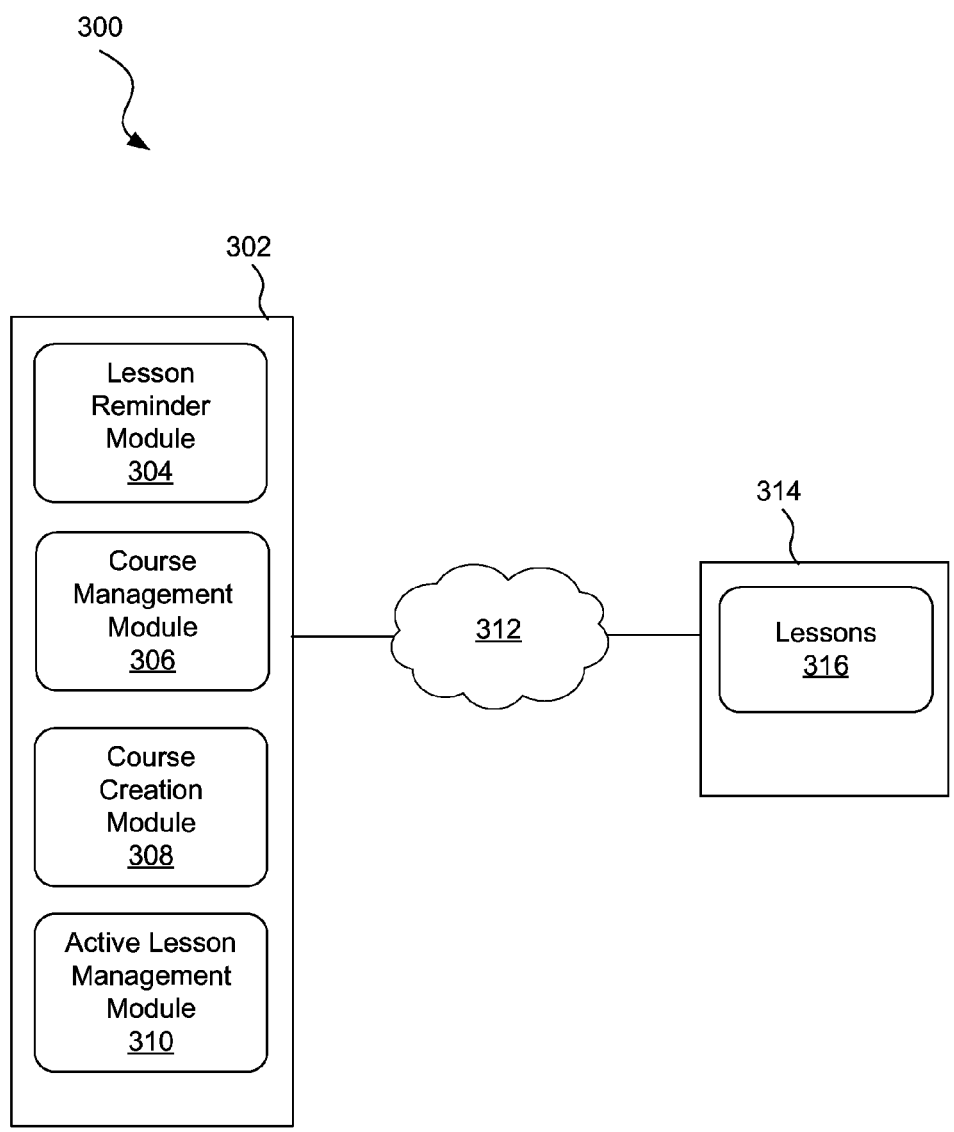
FIG. 3 is a diagram showing an illustrative training module for contextual graphical user interface training, according to one example of principles described herein.

FIG. 3 is a diagram showing illustrative an illustrative training module 302 for contextual graphical user interface training. According to the present example, a training module 302 includes a lesson reminder module 304, a course management module 306, a course creation module 308, and an active lesson management module 310. The training module 302 is also able to communicate with a server 314 over a network 312.

The training module 302 is a set of machine readable instructions that perform the various training functions when executed. In some examples, the training module 302 may be implemented as a discrete application. In some examples, the training module 302 may be implemented within the graphical user interface for whatever program it pertains. For example, if the graphical user interface is a graphical desktop environment, then the training module 302 may be an integral part of the operating system. If the graphical user interface is for a word processing application, then the training module may be an integral part of that word processing application.

The lesson reminder module 304 may keep track of the lessons that the user has scheduled and send reminders to the user as the time and date of those lessons approaches. The user may be notified in a variety of ways. For example, the user may be notified by email. In some examples, the user may be notified by a reminder that pops up within the graphical user interface to which the training module pertains.

In some examples, several lessons may be grouped with an overall category. For example, there may be several lessons within a "Basic Desktop Training" category. Each lesson within this unit may be scheduled. The user may indicate how far apart he or she wishes to take the lessons. For example, the user may opt to take a lesson once per day, or once per week. The lesson reminder module 304 may remind the user, at the appropriate time, that it is time for the next lesson.

In some examples, the lesson reminder module 302 may remind the user that there is an unfinished lesson. As described above, a user may exit out of lesson mode at any time desired without completing a lesson. The lesson reminder module 302 may notify the user that a particular lesson should be finished.

When a lesson reminder pops up, the user may have the option to dismiss the notification completely. The user may also opt to temporarily dismiss the notification. When doing so the user may be reminded later about a lesson. In some examples, the reminder may include a button that starts the lesson when clicked on. Thus, the user can immediately start the lesson. To avoid interrupting the user's work, the lesson reminders may appear when the user first opens the graphical user interface or disengages a screen lock. The user may have the option to turn off lesson reminders if he or she desires not to receive such reminders.

The course management module 306 is used to keep track of what lesson and what groups of lessons the user has scheduled. Additionally, the course management module 306 tracks what lessons have been completed and what lessons have yet to be completed. The course management module 306 may unlock additional lessons for the user after the user has completed certain lessons within a group of lessons.

The course management module 306 may also query a database of lessons to see if any new lessons have been added to the database which the user may be interested in taking. For example, the course management module 306 may recommend certain lessons based on the lessons that are already selected by the user. Lessons may also be recommended based on the type of work the user does with the graphical user interface. For example, if the user regularly uses certain features, then the course management module 306 may suggest additional lessons that relate to those features. The course management module 306 may also make recommendations based on new features of the graphical user interface that have been added through a software update. These recommendations may also be made at convenient times such as when the graphical user interface is first opened.

In some examples, the course management module 306 may provide a web interface where the user can see what lessons are being taken by other users. The user may also share his or her progress on the lessons with other users. In some examples, a user may be rewarded with badges that indicate the lessons that have been completed. These badges may be made available for other users to see. For example, the user may provide input to the system such as clicking on a share button that causes the user's badges to be available for other users to see. The user may also view what badges have been earned by other users.

The course creation module 308 may provide a lesson creation tool to a user. In some examples, this tool may be made available when the user has completed a certain number of lessons in a particular topic. For example, if a user becomes an expert on a certain topic, the user may be provided with a mechanism to create his or her own lesson on that topic. This lesson may then be available to other users.

The course creation tool provided by the course creation module 308 may allow the user to write up descriptions and instructions that may be presented to a receiver of the lesson. These descriptions or instructions may be presented as overlays as designed by the user. The course creation tool may also provide a screencasting feature that allows the user to record various actions taken by the user with the graphical user interface. The screencasts that are made by the user may be used to provide demonstrations for particular tasks of a lesson. The user may also be provided with the tools to make various overlays such as arrows or other indicators. The user may also author a series of lessons related to a particular topic. Some lessons in the series may be designed to be unlocked only after previous lessons are taken.

The active lesson management module 310 is used to manage the different modes such as normal mode and lesson mode. It also manages various modes within lesson mode. For example, the lesson mode may include an explanation mode, a demonstration mode, and a user input mode. The active management module may also listen for inputs that indicate the user wishes to exit the lesson, such as by pressing the escape key.

While in explanation mode, the overlays may be used to explain certain features to a user. While in demonstration mode, user input may be locked while the cursor moves to perform the relevant tasks for the user. While in user input mode, the user is allowed to operate the graphical user interface. The user can then use this ability to perform the recently demonstrated task.

The active lesson management module 310 may change between various modes, and display different overlays as indicated by a set of timestamps associated with a lesson. Specifically, the various instructions, overlays, and demonstrations associated with a lesson are assigned timestamps that indicate when those components should be activated.

The active lesson management module 310 may listen for user input that indicates completion of tasks and then cause the lesson to move on to the next task. After the user has completed a lesson, the active management module 310 can report to the course management module to update the user's lesson completion status. If a user chooses to end a lesson early, the active lesson management module 310 may save the state of the lesson and resume that state when the user chooses to continue the lesson.

The training module 302 may communicate with a server 314 over a network 312. The server may store various data that may be helpful to the training module 302. For example, the server 314 may store software updates for the training module 302 and push these updates to the training module 302 as needed. The server 314 may also store several lessons 316 for the training module 302. These lessons 316 may be created by the developer of the graphical user interface or by other users of the graphical user interface.

Figure 4:
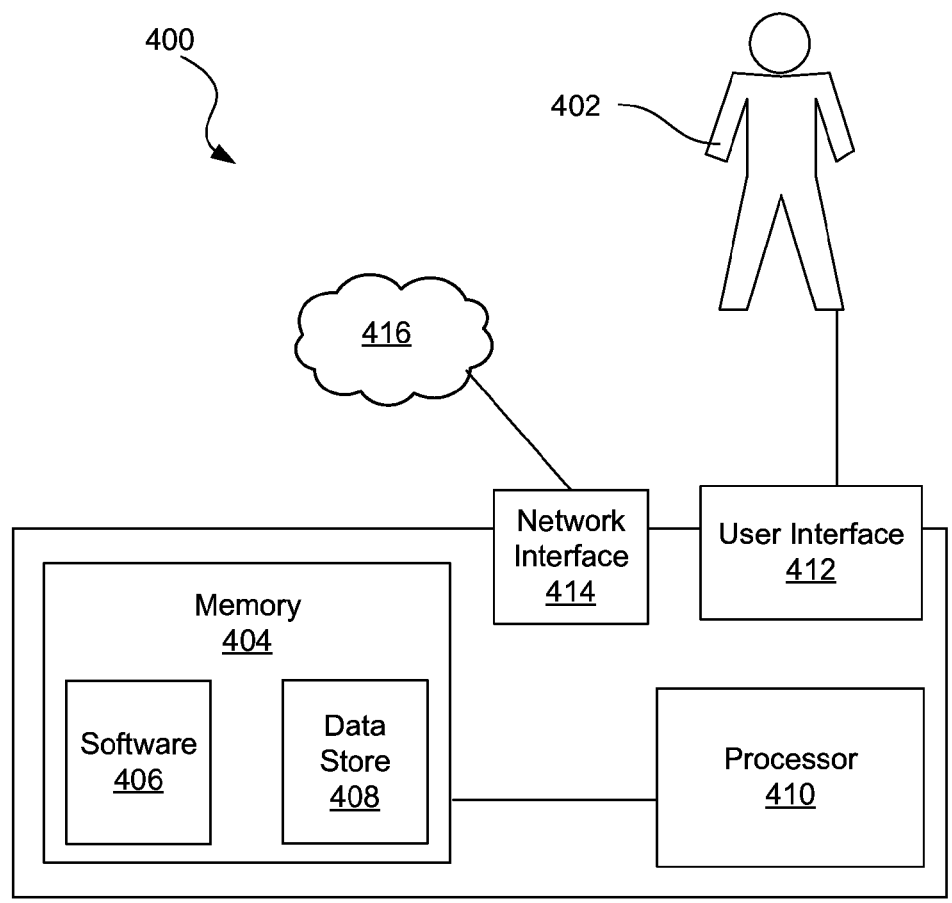
FIG. 4 is a diagram showing an illustrative computing system that can be used for contextual graphical user interface training, according to one example of principles described herein.

FIG. 4 is a diagram showing an illustrative computing system 400 that can be used for contextual graphical user interface training. According to certain illustrative examples, the processing system 400 includes a memory 404 which may include software 406 and a data store 408. The processing system 400 also includes a processor 410, a network interface 414, and a user interface 412.

The memory 404 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 406 and data in the data store 408.

The processing system 400 also includes a processor 410 for executing the software 406 and using or updating the data 408 stored in memory 404. The software 406 may include an operating system and any other software applications a user may wish to install. The software 406 may include the training module as described above. Specifically, the software 406 may include the appropriate machine readable instructions to provide contextual graphical user interface training as described above.

The user interface 412 may include a number of input devices such as a mouse, touchpad, or touchscreen that allow the user 402 to interact with the computing system 400. The user interface 412 may also include a number of different types of output devices such as a monitor or a touchscreen. The user interface allows the user 402 to interact with the processing system 400 in a manner as described above.

The network interface 414 may include hardware and software that allows the processing system 400 to communicate with other processing systems over a network 416. The network interface 414 may be designed to communicate with the network 416 through hardwire media such as Ethernet, coaxial, fiber-optic, etc. The network interface 416 may also be designed to communicate with the network 416 using wireless technologies.

Figure 5:
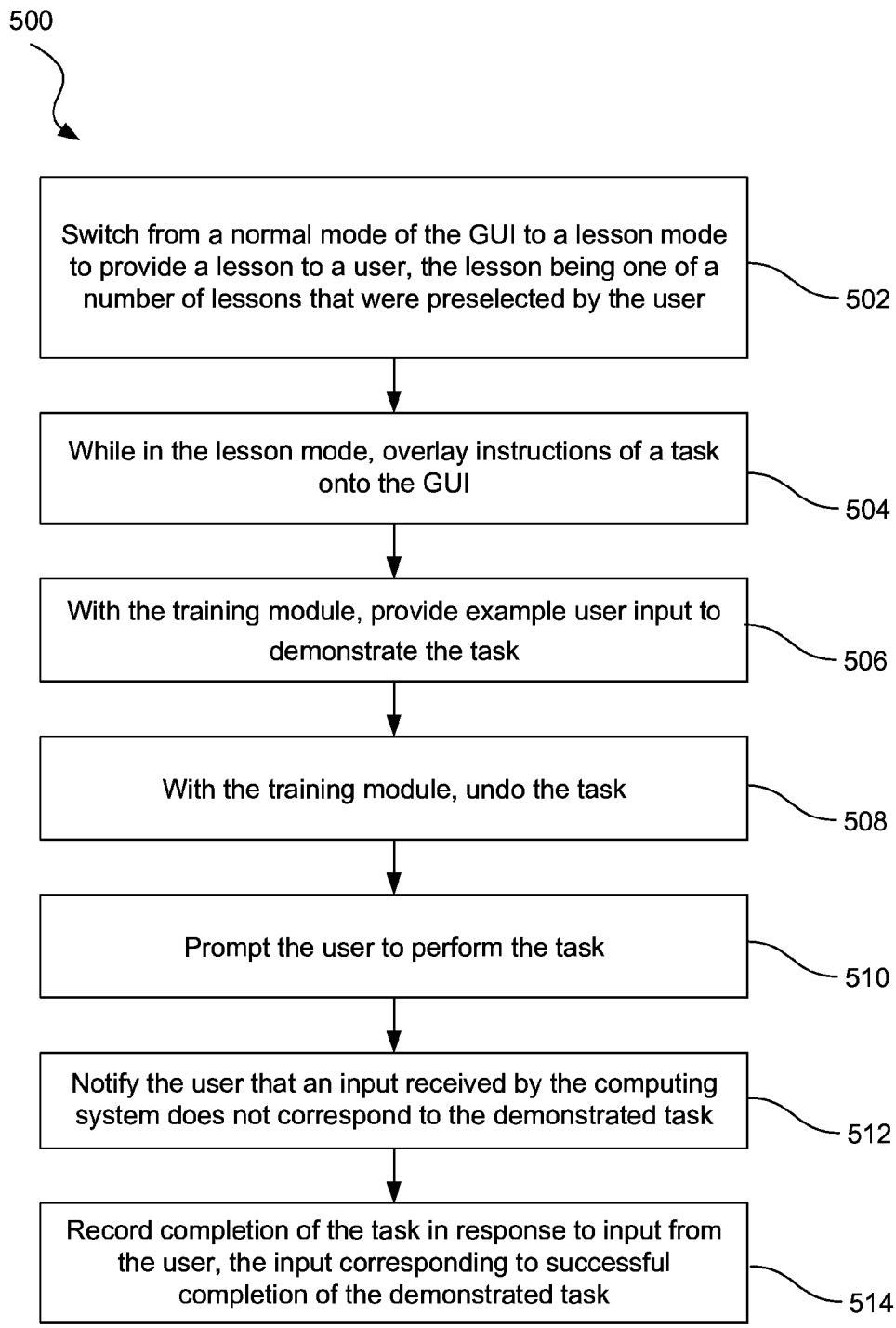
FIG. 5 is a flowchart showing an illustrative method for contextual graphical user interface training, according to one example of principles described herein.

FIG. 5 is a flowchart showing an illustrative method for contextual graphical user interface training. According to certain illustrative examples a method 500 for contextual graphical user interface (GUI) training includes switching 502 from a normal mode of the GUI to a lesson mode to provide a lesson to a user, the lesson teaching the user how to perform a task within the GUI, the lesson being one of a number of lessons that were preselected by the user. As described above, a lesson may include one or more tasks for the user to become more familiar with. The user has the opportunity to select which of the lessons he or she would like to take when the user first opens the graphical user interface to which the lesson pertains.

The method 500 further includes, while in the lesson mode, overlaying 504 instructions of the task onto the GUI, the instructions comprising a demonstration of the task. As described above, in addition to providing demonstrations, the instructions may include overlays such as arrows. The instructions may also include other features that help a user learn how to user a particular feature.

The method 500 further includes, with the training module, providing 506 example user input to demonstrate the task. Thus, the application associated with the GUI can accept input from the training module rather than from the user input devices. Specifically, the training module takes control and provides the input required to perform the task. This input may be referred to as example user input because it is being input for the purpose of providing an example of how to perform a task. The user can watch as this occurs in order to learn how to perform the task.

The method 500 further includes, with the training module, undoing 508 the task. Because the task has already been performed by the training module for the purpose of demonstration, the task is undone so that the user can perform the task. For example, if the task is to open an application, the application can be closed so that the user can open it.

The method 500 further includes, prompting 510 the user to perform the task. Thus, the user can know when the demonstration is done and that control has been passed back to the user. The user can then attempt to perform the task that was just demonstrated.

The method 500 further includes notifying 512 the user that an input received by the computing system does not correspond to the demonstrated task. For example, after a demonstration of the task has been presented, the user may be given the opportunity to perform the task. If the user does not perform the task correctly, or chooses to perform a different task, the user is notified that he or she did not complete the recently demonstrated task. The input may fail to correspond to the task if the user input is in the wrong order, has the wrong timing, or does not match the example user input in relevant ways.

The method 500 further includes recording 514 completion of the task in response to input from the user, the input corresponding to successful completion of the demonstrated task. Thus, if the user does perform the task correctly, the training module can note this task as complete and move on to the next task. If all tasks in a lesson have been noted as complete, then the entire lesson can be noted as complete.

Some examples of processing systems described herein may include non-transient, tangible, machine readable media that include executable code that when run by one or more processors (e.g., processor 410) may cause the one or more processors to perform the processes of method 500 as described above. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for contextual graphical user interface (GUI) training, the method performed by a computing system supporting the GUI, the method comprising:
    with a training module, switching from a normal mode of the GUI to a lesson mode to provide a lesson to a user, the lesson being one of a number of lessons that were preselected by the user;
    while in the lesson mode, overlaying instructions of a task onto the GUI;
    with the training module, providing example user input to demonstrate the task;
    with the training module, undoing the task;
    prompting the user to perform the task;
    notifying the user that an input received by the computing system does not correspond to the demonstrated task;
    recording completion of the task in response to input from the user, the input corresponding to successful completion of the demonstrated task;
    maintaining a list of the lessons completed by the user; and
    in response to the user completing a predefined number of the lessons on a particular topic, providing the user with a course creation tool.

2. The method of claim 1, further comprising, before switching to lesson mode, prompting a user to select at least one of a number of lessons to be presented to the user.

3. The method of claim 2, wherein the prompting occurs after at least one of: first use of the GUI, a preset time after first use of the GUI.

4. The method of claim 2, wherein the prompting occurs after at least one of: startup of the GUI or an ending of a screen lock.

5. The method of claim 1, further comprising reminding the user of an upcoming scheduled lesson.

6. The method of claim 1, further comprising:
    maintaining a list of selected and unselected lessons for a user;
    querying a server for additional lessons; and
    receiving additional lessons from the server.

7. The method of claim 6, further comprising, prompting the user to indicate whether the user wishes to receive one of the additional lessons.

8. The method of claim 6, further comprising, receiving input from the user indicating a de-selection or selection of lessons.

9. The method of claim 6, further comprising, with the course management module, doing at least one of:
 associating badges with the user for completing lessons;
 receiving input from a user indicating a desire to share lesson achievements with other users.

10. The method of claim 1, further comprising, transmitting a user created lesson to a server.

11. The method of claim 1, further comprising, while in lesson mode;
 locking normal user input while the training module assumes user input to demonstrate the task; and
 unlocking user input after the task is demonstrated.

12. The method of claim 1, further comprising, providing the user with an escape control to switch from the lesson mode back to the normal mode.

13. The method of claim 12, further comprising:
 saving a state of an uncompleted lesson if the user switches to the normal mode before completion of the lesson; and
 resuming the uncompleted lesson in response to user input that indicates that the user wishes to resume the lesson.

14. A computing system comprising:
 a processor; and
 a memory comprising machine readable instructions that when executed by the processor, cause the processor to:
 prompt a user to select a number of lessons for a graphical user interface (GUI), each lesson comprising a number of tasks associated with the GUI;
 schedule selected lessons for the user;
 at a scheduled lesson start time, switch from a normal mode of the GUI to a lesson mode to provide the scheduled lesson to the user;
 while in the lesson mode, overlay instructions of a task of the scheduled lesson onto the GUI, the instructions comprising a demonstration of the task of the scheduled lesson;
 while in lesson mode, undoing the demonstrated task;
 while in lesson mode, maintain GUI functionality related to tasks not associated with the lesson;
 notify the user that an input received by the system does not correspond to the demonstrated task of the scheduled lesson;
 record completion of the task of the scheduled lesson in response to input from the user, the input corresponding to successful completion of the demonstrated task of the scheduled lesson;
 maintaining a list of the lessons completed by the user; and
 in response to the user completing a predefined number of the lessons, providing the user with a course creation tool.

15. The system of claim 14, further comprising, in response to the user completing a preset number of lessons on a topic, providing the user with a lesson creation tool, the lesson creation tool allowing the user to create lessons.

16. The system of claim 14, wherein the instructions further include at least one of: audio instructions, video instructions, and text instructions, graphics, and arrows.

17. A non-transitory, machine-readable medium comprising a set of machine readable instructions that when executed by a processor, cause the processor to:
 switch from a normal mode of the GUI to a lesson mode to provide a lesson to a user, the lesson teaching the user how to perform a task within the GUI, the lesson being one of a number of lessons that were preselected by the user;
 while in the lesson mode, overlay instructions of the task onto the GUI, the instructions related to the task;
 while in lesson mode, assume user input control to perform the task;
 while in lesson mode, undoing the task after it has been performed;
 maintain GUI functionality related to tasks not associated with the lesson;
 notifying the user that an input received by the system does not correspond to the demonstrated task;
 recording completion of the task in response to input from the user, the input corresponding to successful completion of the demonstrated task;
 lock normal user while the task is demonstrated;
 unlock user input after the task is demonstrated;
 maintaining a list of the lessons completed by the user; and
 in response to the user completing a predefined number of the lessons on a particular topic, providing the user with a course creation tool.

18. The machine-readable medium of claim 17, wherein the machine readable instructions further cause the processor to provide an escape control to a user that unlocks user input and switches from lesson mode to normal mode.

19. The machine-readable medium of claim 17, wherein the machine readable instructions further cause the processor to display different pieces of the instructions of the task at predefined timestamps.

20. The machine-readable medium of claim 17, wherein the machine readable instructions further cause the processor to, while in lesson mode;
 lock normal user input while the training module assumes user input to demonstrate the task; and
 unlock user input after the task is demonstrated.

* * * * *